(12) United States Patent
Kubota et al.

(10) Patent No.: US 10,744,424 B2
(45) Date of Patent: Aug. 18, 2020

(54) ANTI-FOAMING PIPE AND COMPRESSOR SYSTEM

(71) Applicant: MITSUBISHI HEAVY INDUSTRIES COMPRESSOR CORPORATION, Tokyo (JP)

(72) Inventors: Michio Kubota, Hiroshima (JP); Tomoaki Takeda, Hiroshima (JP)

(73) Assignee: MITSUBISHI HEAVY INDUSTRIES COMPRESSOR CORPORATION, Tokyo (JP)

( * ) Notice: Subject to any disclaimer, the term of this patent is extended or adjusted under 35 U.S.C. 154(b) by 141 days.

(21) Appl. No.: 16/090,925

(22) PCT Filed: Jun. 16, 2016

(86) PCT No.: PCT/JP2016/067913
§ 371 (c)(1),
(2) Date: Oct. 3, 2018

(87) PCT Pub. No.: WO2017/216921
PCT Pub. Date: Dec. 21, 2017

(65) Prior Publication Data
US 2019/0105585 A1    Apr. 11, 2019

(51) Int. Cl.
| | | |
|---|---|---|
| *B01D 19/02* | (2006.01) | |
| *F04B 39/02* | (2006.01) | |
| *F04C 29/02* | (2006.01) | |
| *B01D 19/00* | (2006.01) | |

(52) U.S. Cl.
CPC ......... *B01D 19/02* (2013.01); *B01D 19/0042* (2013.01); *B01D 19/0052* (2013.01); *F04B 39/02* (2013.01); *F04B 39/0284* (2013.01); *F04C 29/02* (2013.01); *F04C 29/028* (2013.01); *F04C 2240/809* (2013.01)

(58) Field of Classification Search
CPC ........... B01D 19/0042; B01D 19/0052; B01D 19/02; F04B 39/02; F04B 39/0284; F04C 2240/809; F04C 29/02; F04C 29/028
See application file for complete search history.

(56) References Cited

FOREIGN PATENT DOCUMENTS

| | | |
|---|---|---|
| JP | S53-106839 U | 8/1978 |
| JP | S54-057273 A | 5/1979 |
| JP | H04-087602 A | 3/1992 |

(Continued)

OTHER PUBLICATIONS

International Search Report issued in corresponding International Application Na PCT/JP2016/067913 dated Aug. 23, 2016 (4 pages).

(Continued)

*Primary Examiner* — Cabrena Holecek
(74) *Attorney, Agent, or Firm* — Osha Liang LLP (57) ABSTRACT

The present invention includes a pipe body having a hollow part, a liquid flows through at least a lower part of the hollow part, and of which one end is connected to a lubricating oil tank, wherein lubricating oil is introduced to the lubricating oil tank through the pipe body; and a first overflow weir positioned at least a lower part of the hollow part in a state where a position of the first overflow weir with respect to the pipe body is held, wherein the lubricating oil is allowed to flow over the first overflow weir toward the lubricating oil tank.

10 Claims, 7 Drawing Sheets

(56) References Cited

FOREIGN PATENT DOCUMENTS

| | | | | |
|---|---|---|---|---|
| JP | 07308512 A | * | 11/1995 | ............ B01D 19/02 |
| JP | H07-308512 A | | 11/1995 | |
| JP | 2000-320933 A | | 11/2000 | |

OTHER PUBLICATIONS

Written Opinion issued in corresponding International Application No. PCT/JP2016/067913 dated Aug. 23, 2016 (10 pages).

* cited by examiner

ANTI-FOAMING PIPE AND COMPRESSOR SYSTEM

TECHNICAL FIELD

The invention relates to an anti-foaming pipe that removes bubbles included in a liquid, and a compressor system including the anti-foaming pipe.

BACKGROUND ART

In the related art, as a system that removes bubbles included in a liquid, for example, there is a bubble removal system disclosed in Patent Document 1.

Patent Document 1 discloses a bubble removal system including a pump that supplies a liquid; a bubble removal device container having an inflow port that is connected to a discharge port of the pump and causes a tangential flow in a cylindrical or conical internal diameter, an outflow port that is provided opposite to an end surface side of the inflow port in an axial direction, and a ventilation port that is provided in an axial center end surface of the container on the inflow port side; and a throttle valve that is disposed on a suction side of the pump and in the outflow port of the bubble removal device.

Meanwhile, in a compressor system having a compressor, a lubricating oil tank, a lubricating oil supply line, and a pump that is provided in the lubricating oil supply line and supplies lubricating oil stored within the lubricating oil tank to a bearing device, and a lubricating oil return line that returns the lubricating oil, which is recovered from the bearing device, to the lubricating oil tank, there is a case where an old compressor is replaced with a new compressor having excellent performance.

In such a case, there is a case where an old lubricating oil tank is replaced with a new lubricating oil tank with a large capacity corresponding to the capacity of the new compressor, and a case where an auxiliary tank for compensating for a capacity that is insufficient with the old lubricating oil tank is separately provided without replacing the old lubricating oil tank, and the auxiliary tank and the lubricating oil tank are connected together using a connecting tube, and the lubricating oil is returned via the auxiliary tank.

However, since cost becomes high if the old lubricating oil tank is replaced with the new lubricating oil tank, there is a case where the auxiliary tank and the connecting tube are provided to suppress an increase in cost.

In the compressor system having the above configuration, it is preferable that there be few bubbles included in the lubricating oil stored within the lubricating oil tank from a viewpoint of protecting the pump from the bubbles included in the lubricating oil.

CITATION LIST

Patent Document

Patent Document 1: Japanese Unexamined Patent Application, First Publication No. H4-87602

SUMMARY OF INVENTION

Technical Problem

In the above-described compressor system, in order to reduce the bubbles included in the lubricating oil stored within the lubricating oil tank, it is possible to apply the bubble removal system disclosed in PTL 1.

However, in a case where the installation area of the compressor system is narrow, it becomes difficult to secure an area (installation space) where the bubble removal system disclosed in PTL 1 can be installed.

Additionally, in the bubble removal system disclosed in PTL 1, three constituent elements (the bubble removal device container, the throttle valve disposed on the suction side of the pump, and the throttle valve disposed in the outflow port of the bubble removal device) are required. Therefore, there is a concern that the cost may increase.

Thus, the invention relates to an anti-foaming pipe and a compressor system that can suppress an increase in cost and can be installed even in a case where an installation space of an anti-foaming pipe is narrow.

Solution to Problem

An anti-foaming pipe according to a first aspect of the invention includes a pipe body having a hollow part, a liquid flows through at least a lower part of the hollow part, and of which one end is connected to a tank, wherein the liquid is introduced to the tank through the pipe body, and a first overflow weir positioned at at least a lower part of the hollow part in a state where a position of the first overflow weir with respect to the pipe body is held, wherein the liquid is allowed to flow over the first overflow weir toward the tank.

Since the first overflow weir having such a configuration is provided, it is possible to cause a plurality of bubbles included in the liquid to adhere to the first overflow weir, thereby the bubbles are gathered and some of them are unified. The unified and enlarged bubbles are come rise up to a surface of the liquid. Therefore, it is possible to escape the bubbles into a gaseous phase in contact with the surface of the liquid.

Accordingly, since it is possible to reduce the amount of the bubbles included in the liquid that overflows the first overflow weir, thus a situation in which the liquid in which a number of the bubbles are included flows into the tank can be suppressed.

Additionally, since it is possible to make the configuration of the first overflow weir simple, an increase in cost for preparing the anti-foaming pipe can be suppressed.

Moreover, since the first overflow weir is arranged within the pipe body, the bubbles included in the liquid are removed. Therefore, it becomes unnecessary to separately prepare the installation area for arranging the first overflow weir outside the pipe body. That is, the first overflow weir can be installed even in a case where the installation area is small.

Additionally, in the anti-foaming pipe according to a second aspect of the invention, the first overflow weir may be a plate-shaped member across an extending direction of the pipe body, and the first overflow weir is formed along the lower part of the hollow part.

In this way, since the first overflow weir that is a plate-shaped member is formed along the lower part of the hollow part, thus the area of the surface of the first overflow weir that intersects a flow direction of the liquid is increased. Thus, the bubbles included in the liquid are likely to adhere to the surface of the first overflow weir.

Accordingly, the plurality of bubbles adhering to the surface of the first overflow weir are likely to be gathered and unified with each other, a number of the bubbles included in the liquid can be caused to escape in a gaseous phase in contact with the surface of the liquid.

Also, the anti-foaming pipe according to a third aspect of the invention may further include a second overflow weir positioned at at least the lower part of the hollow part so as to be close to the tank with respect to the first overflow weir in a state where a position of the second overflow weir with respect to the pipe body is held, wherein the liquid, which has flowed over the first overflow weir, is allowed to flow over the second overflow weir toward the tank.

Since the second overflow weir having such a configuration is provided, it is possible to obtain the same effects as those of the first overflow weir. Accordingly, the amount of the bubbles included in the liquid can be further reduced.

Additionally, since the second overflow weir is provided, a portion of the liquid can be dammed up with the second overflow weir, thus the height of the surface of the liquid existing between the first overflow weir and the second overflow weir can be made high.

Additionally, in the anti-foaming pipe according to a fourth aspect of the invention, a height of the second overflow weir from the lowest point of the lower part of the hollow part may be equal to or lower than that of the first overflow weir from the lowest point of the lower part of the hollow part.

In this way, since the height of the second overflow weir to be equal to or lower than the height of the first overflow weir, the liquid which has flowed over the first overflow weir is likely to overflow the second overflow weir. Thus, the liquid can be easily moved toward the tank.

Additionally, in the anti-foaming pipe according to a fifth aspect of the invention, the second overflow weir may be a plate-shaped member across the extending direction of the pipe body, and the second overflow weir may be formed along the lower part of the hollow part.

In this way, since the shape of the second overflow weir that is a plate-shaped member is formed along the inner surface of the pipe body, the contact area between the second overflow weir and the liquid is increased. Thus, the bubbles remaining in the liquid are likely to adhere to the surface of the second overflow weir intersecting the flow direction of the liquid.

Accordingly, the plurality of bubbles adhering to the surface of the second overflow weir are likely to be gathered and unified with each other, the bubbles remaining in the liquid can be caused to escape in a gaseous phase in contact with the surface of the liquid.

Additionally, the anti-foaming pipe according to a sixth aspect of the invention may further include a barrier positioned at at least on an upper part of the hollow part so as to be close to the tank with respect to of the first overflow weir in a state where a position of the barrier with respect to the pipe body is held, wherein an upper stream of the liquid, which has flowed over the first overflow weir, is capable of contacting with the barrier, and the liquid is allowed to pass through the barrier toward the second overflow weir.

Since the barrier having as such a configuration is provided, it is possible to bring an upper stream of the liquid flowing from the first overflow weir side, in which a number of the bubbles are included, into contact with the barrier and to dam up the bubbles included in the upper stream of the liquid with the barrier. Accordingly, the amount of the bubbles included in the liquid flowing toward the tank from the barrier can be further reduced.

Additionally, in the anti-foaming pipe according to a seventh aspect of the invention, the barrier may be a plate-shaped member across the extending direction of the pipe body, and the barrier is formed along the upper part of the hollow part.

In this way, the shape of the barrier that is a plate-shaped member is formed along the upper part of the hollow part, the contact area between the barrier and the upper stream of the liquid is increased. Thus, it is possible to further suppress a situation where the bubbles included in the upper stream of the liquid move toward the tank from the barrier.

Additionally, in the anti-foaming pipe according to an eighth aspect of the invention, a lower end part of the barrier may face an upper end part of the second overflow weir in the extending direction of the pipe body.

In this way, since the lower end part of the barrier faces the upper end part of the second overflow weir in the extending direction of the pipe body, the upper stream of the liquid, which has flowed over the first overflow weir, can be reliably brought into contact with the lower end part of the barrier.

Additionally, the anti-foaming pipe according to a ninth aspect of the invention may further include an anti-foaming mechanism including the first overflow weir, the second overflow weir, the barrier, a plurality of support rods extending in the extending direction of the pipe body and which support the first overflow weir, the second overflow weir and the barrier, and a ring-shaped member positioned at the other end of the pipe body to secure one end of each of the plurality of support rods. The anti-foaming mechanism may be configured to be removably attached to the pipe body.

Since such a configuration is provided, the attachment and detachment of the anti-foaming mechanism with respect to the pipe body can be easily performed, and the position of one end of each of the plurality of support rods can be restricted.

Additionally, in the anti-foaming pipe according to a tenth aspect of the invention, a gap may be provided between an inner surface of the pipe body and each of the first overflow weir, the second overflow weir and the barrier in a state where the anti-foaming mechanism is mounted on the pipe body.

In this way, since the gap is provided between an inner surface of the pipe body and each of the first overflow weir, the second overflow weir and the barrier, the inner surface of the pipe body less likely to come into contact with each of the first overflow weir, the second overflow weir and the barrier when the anti-foaming mechanism is attached to and detached from the pipe body.

Therefore, the attachment and detachment of the anti-foaming mechanism with respect to the pipe body can be easily performed, and damage to the first overflow weir, the second overflow weir and the barrier at the time of the attachment and detachment of the anti-foaming mechanism can be suppressed.

Additionally, a compressor system according to an eleventh aspect of the invention includes the anti-foaming pipe according to any one of the first to tenth aspects, a compressor including a rotor which is rotatable around an axis, and a bearing device supporting the rotor in a rotatable state, a lubricating oil tank which is connected to one end of the anti-foaming pipe and in which lubricating oil is stored, a lubricating oil supply line which is connected to the lubricating oil tank and the bearing device, a pump which is installed on the lubricating oil supply line and configured to supply the lubricating oil stored in the lubricating oil tank to the bearing device, an auxiliary tank which is connected to the other end of the anti-foaming pipe, and a lubricating oil return line of which one end is connected to the bearing device and the other end is connected to the auxiliary tank, wherein the lubricating oil, which has recovered from the bearing device, returned to the auxiliary tank.

According to the compressor system having such a configuration, since the lubricating oil passes through the anti-foaming pipe, it is possible to the amount of the bubbles included in the lubricating oil returned from the auxiliary tank to the lubricating oil tank.

Accordingly, it is possible to sufficiently perform the anti-foaming of the lubricating oil returned to the lubricating oil tank, thus damage to the pump resulting from the bubbles included in the lubricating oil can be suppressed.

Advantageous Effects of Invention

According to the invention, an increase in cost for preparation of the anti-foaming pipe can be suppressed, and the anti-foaming pipe can be installed even in a case where the installation area is small.

DESCRIPTION OF EMBODIMENTS

First Embodiment

Figure 1:
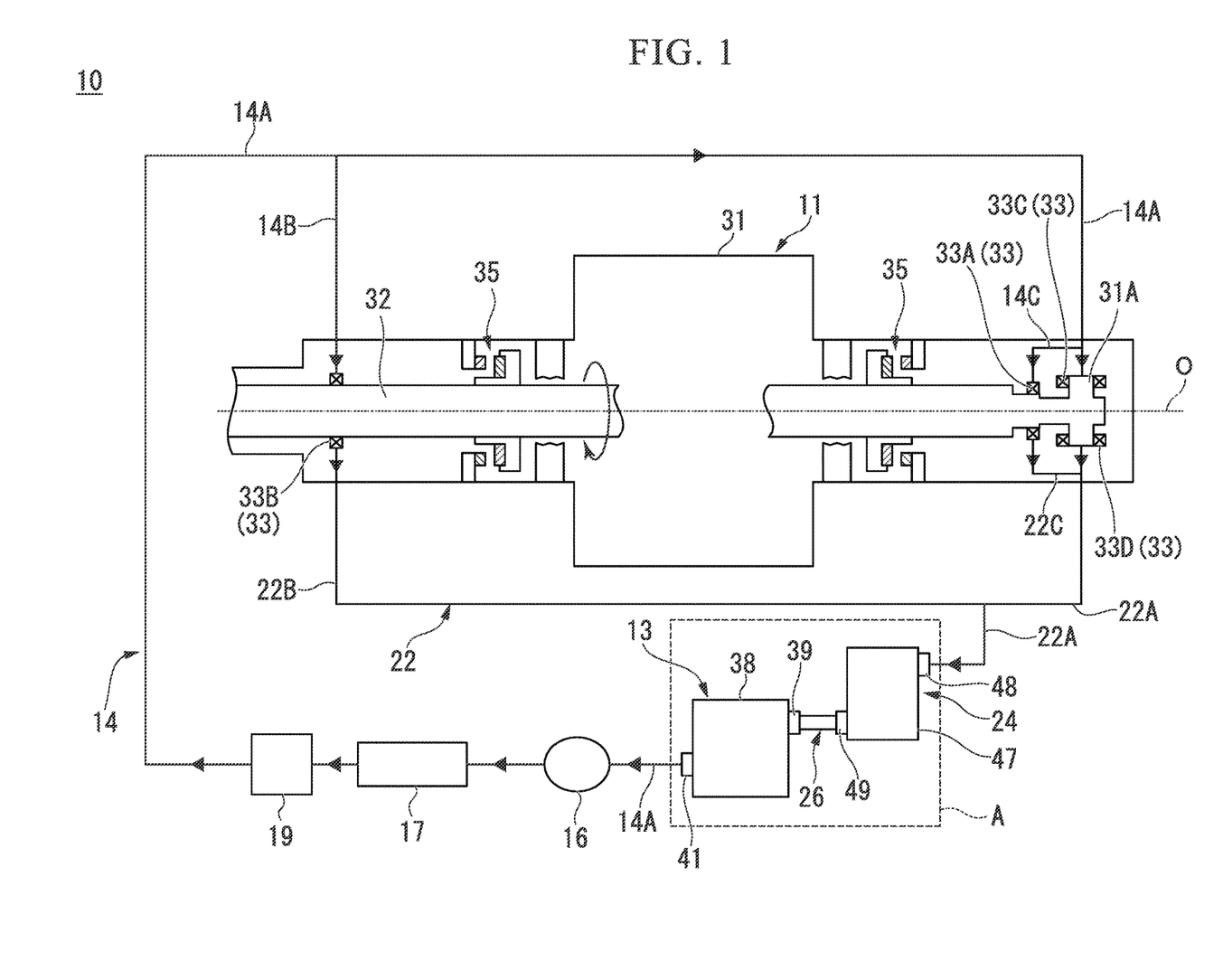
FIG. 1 is a view schematically illustrating a schematic configuration of a compressor system according to a first embodiment of the invention.

FIG. 1 is a view schematically illustrating a schematic configuration of a compressor system according to a first embodiment of the invention.

In the first embodiment, the following description will be given taking a case where an auxiliary tank 24 for compensating for a capacity that is insufficient with only the capacity of an old lubricating oil tank 13 by replacing an old compressor with a new compressor 11 having excellent performance is provided, as an example of a compressor system 10. Additionally, in the first embodiment, lubricating oil L is taken as an example of a liquid.

Referring to FIG. 1, the compressor system 10 of the first embodiment has a compressor 11, a lubricating oil tank 13, a lubricating oil supply line 14, a feed pump 16, an oil cooler 17, an oil filter 19, a lubricating oil return line 22, the auxiliary tank 24, and an anti-foaming pipe 26.

The compressor 11 has a casing 31, a rotor 32, a bearing device 33, and a dry gas sealing part 35. The compressor 11 takes in gas as a working fluid to generate a compressed fluid as the rotor 32 rotates.

In addition, the application of the compressed fluid generated in the compressor 11 is not limited at all.

The casing 31 accommodates the rotor 32 that extends in a predetermined direction. A thrust collar 31A is provided at one end part of the casing 31. The thrust collar 31A protrudes in a direction orthogonal to an axis O of the rotor 32 and is formed in a ring shape.

The rotor 32 is supported within the casing 31 so as to be rotatable around the axis O of the rotor 32.

The bearing device 33 has radial bearing parts 33A and 33B (a pair of radial bearing parts), and thrust bearing parts 33C and 33D (a pair of thrust bearing parts).

The radial bearing part 33A is disposed so as to face an outer peripheral surface of the rotor 32 located at one end part of both end parts of the rotor 32.

The radial bearing part 33B is disposed so as to face the outer peripheral surface of the rotor 32 located at the other end part of both the end parts of the rotor 32.

The radial bearing parts 33A and 33B support the rotor 32 around the axis O thereof.

The thrust bearing parts 33C and 33D are disposed so as to face each other via the thrust collar 31A from a thrust direction. The thrust bearing parts 33C and 33D support the rotor 32 in a rotatable state and suppress displacement of the rotor 32 in the direction of the axis O.

The dry gas sealing part 35 is a mechanism for sealing a gap formed between the casing 31 and the rotor 32 with seal gas.

The dry gas sealing part 35 suppresses leakage of the working fluid from the casing 31 to the outside thereof with the seal gas. The dry gas sealing part 35 is disposed at a position closer to the center of the rotor 32 than positions where the pair of radial bearing parts 33A and 33B are disposed. As the compressor 11 having the above configuration, for example, it is possible to use a multi-stage centrifugal compressor.

Figure 2:
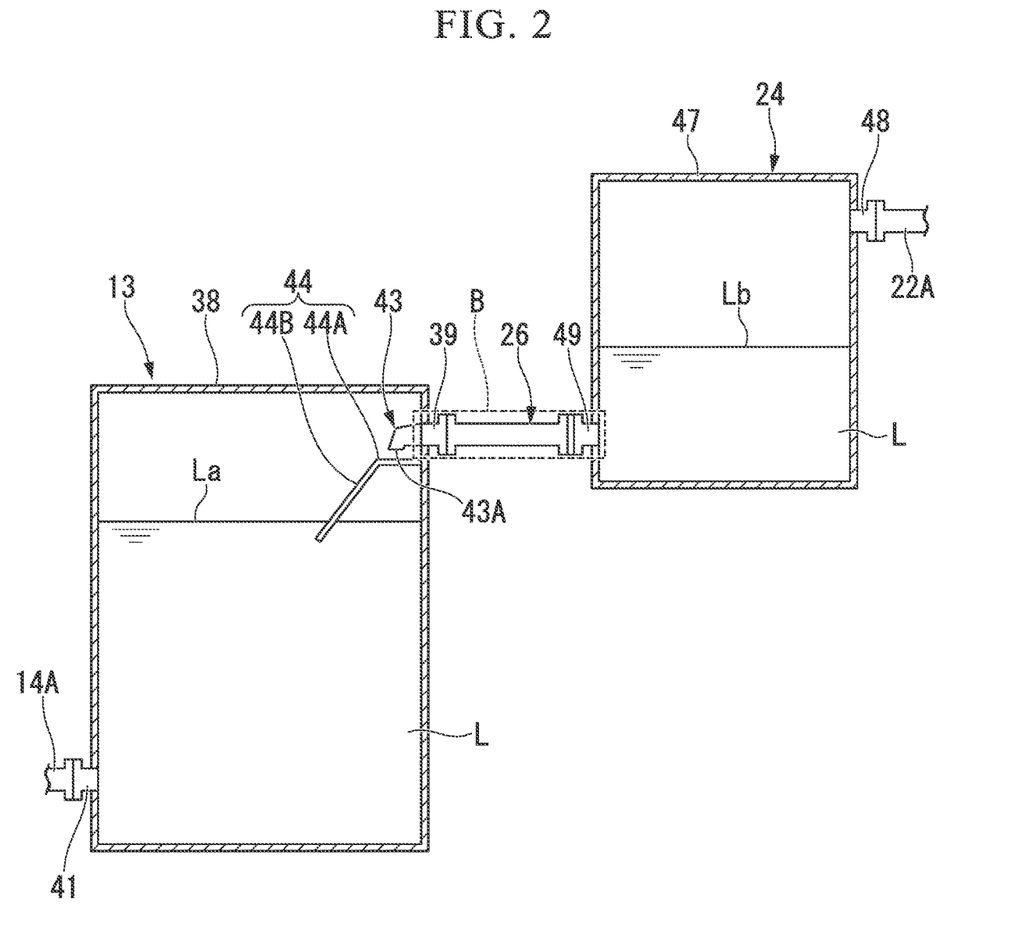
FIG. 2 is an enlarged view of a portion surrounded by a region A and a sectional view illustrating tank bodies of a lubricating oil tank and an auxiliary tank, in the compressor system illustrated in FIG. 1.

FIG. 2 is an enlarged view of a portion surrounded by a region A and a sectional view illustrating tank bodies of the lubricating oil tank and the auxiliary tank, in the compressor system illustrated in FIG. 1. In FIG. 2, the same components as those of the structure illustrated in FIG. 1 are denoted by the same reference signs.

Referring to FIGS. 1 and 2, the lubricating oil tank 13 has a tank body 38, an introducing part 39, a delivery part 41, a drain nozzle 43, and a degassing tray 44.

The lubricating oil L to be supplied to the bearing device 33 is stored within the tank body 38. A gaseous phase is formed above a liquid level La of the lubricating oil L stored within the tank body 38.

The introducing part 39 is provided in an outer peripheral side surface of an upper part of the tank body 38. The introducing part 39 is disposed above the liquid level La of the lubricating oil L stored within the tank body 38.

The delivery part 41 is provided on the outer peripheral side surface of a lower part of the tank body 38. The delivery part 41 is disposed below the liquid level La of the lubricating oil L stored within the tank body 38.

The drain nozzle 43 is disposed within the tank body 38 and is connected to the introducing part 39. The drain nozzle 43 has a discharge port 43A for discharging the lubricating oil L supplied via the introducing part 39 downward.

The degassing tray 44 is provided within the tank body 38 and has a first portion 44A and a second portion 44B.

The first portion 44A is disposed below the discharge port 43A and above the liquid level La. The first portion 44A horizontally extends from an inner wall surface of the tank body 38 toward the inside of the tank body 38.

The second portion 44B is provided at one end of the first portion 44A. The second portion 44B extends obliquely downward from the one end of the first portion 44A. The second portion 44B is in contact with the lubricating oil L within the tank body 38.

The degassing tray 44 having the above configuration guides the lubricating oil L sent from the drain nozzle 43 to the liquid level La of the lubricating oil L within the tank body 38.

In this case, since the lubricating oil L, which is discharged from the discharge port 43A of the drain nozzle 43 and is brought into a liquid state, flows along the degassing tray 44, it is possible to suppress a situation in which the lubricating oil L foams in the lubricating oil L stored within the tank body 38 (bubbles are generated).

The lubricating oil supply line 14 has a line 14A, a first branch line 14B, and a second branch line 14C.

The line 14A has one end connected to the delivery part 41 and has the other end connected to the thrust bearing parts 33C and 33D in a state where the lubricating oil L is capable of being supplied to the thrust bearing parts 33C and 33D.

The line 14A is provided with the feed pump 16, the oil cooler 17, and the oil filter 19.

The line 14A is a line for supplying the lubricating oil L, which is delivered from the inside of the tank body 38, to the pair of thrust bearing parts 33C and 33D.

The first branch line 14B is a line that is branched from a line 14A located in a subsequent stage of the oil filter 19, and is connected to the radial bearing part 33B disposed at one end part of the rotor 32.

The first branch line 14B supplies portion of the lubricating oil L flowing through the inside of the line 14A to the radial bearing part 33B.

The second branch line 14C is branched from the line 14A located in a subsequent stage (a downstream side with respect to the flow of the lubricating oil L) of a branch position of the first branch line 14B, and is connected to the radial bearing part 33A.

The second branch line 14C supplies the remaining portion of the lubricating oil L flowing through the inside of the line 14A to the radial bearing part 33A.

The feed pump 16 is provided in the line 14A located between the branch position of the first branch line 14B and the delivery part 41. The feed pump 16 pumps the lubricating oil L stored within the tank body 38 toward the bearing device 33.

The oil cooler 17 is provided in the line 14A located between the branch position of the first branch line 14B and the feed pump 16. The oil cooler 17 cools the lubricating oil L supplied from the feed pump 16.

The oil filter 19 is provided in the line 14A located between the branch position of the first branch line 14B and the oil cooler 17. The oil filter 19 removes foreign matter, such as dust mixed with the lubricating oil L delivered from the oil cooler 17.

The lubricating oil return line 22 has a line 22A, a first branch line 22B, and a second branch line 22C.

The line 22A has one end used in the thrust bearing parts 33C and 33D and connected to the thrust bearing parts 33C and 33D in a state where the lubricating oil L having a high temperature can be recovered, and has the other end connected to the auxiliary tank 24. The line 22A returns the lubricating oil L to the inside of the auxiliary tank 24.

The first branch line 22B is branched from the line 22A and is connected to the radial bearing part 33B. The first branch line 22B is used in the radial bearing part 33B and introduces the lubricating oil L having a high temperature into the line 22A.

The second branch line 22C is branched from the line 22A located between the branch position of the first branch line 22B and the thrust bearing parts 33C and 33D and is connected to the radial bearing part 33A.

The second branch line 22C is used in the radial bearing part 33A and introduces the lubricating oil L having a high temperature into the line 22A.

The auxiliary tank 24 has a tank body 47, an introducing part 48, and a delivery part 49.

The lubricating oil L recovered from the bearing device 33 is stored within the tank body 47. A gaseous phase is formed above a liquid level Lb of the lubricating oil L stored within the tank body 47.

The capacity of the tank body 47 is set to a size such that the insufficiency of the capacity of the lubricating oil tank 13 can be compensated for. For this reason, the size of the auxiliary tank 24 is smaller than the size of the lubricating oil tank 13.

The introducing part 48 is provided in an outer peripheral side surface of an upper part of the tank body 47. The introducing part 48 is disposed above the liquid level Lb of the lubricating oil L stored within the tank body 47.

The delivery part 49 is provided in the outer peripheral side surface of a lower part of the tank body 47. The delivery part 49 is disposed below the liquid level Lb of the lubricating oil L stored within the tank body 47.

Figure 3:
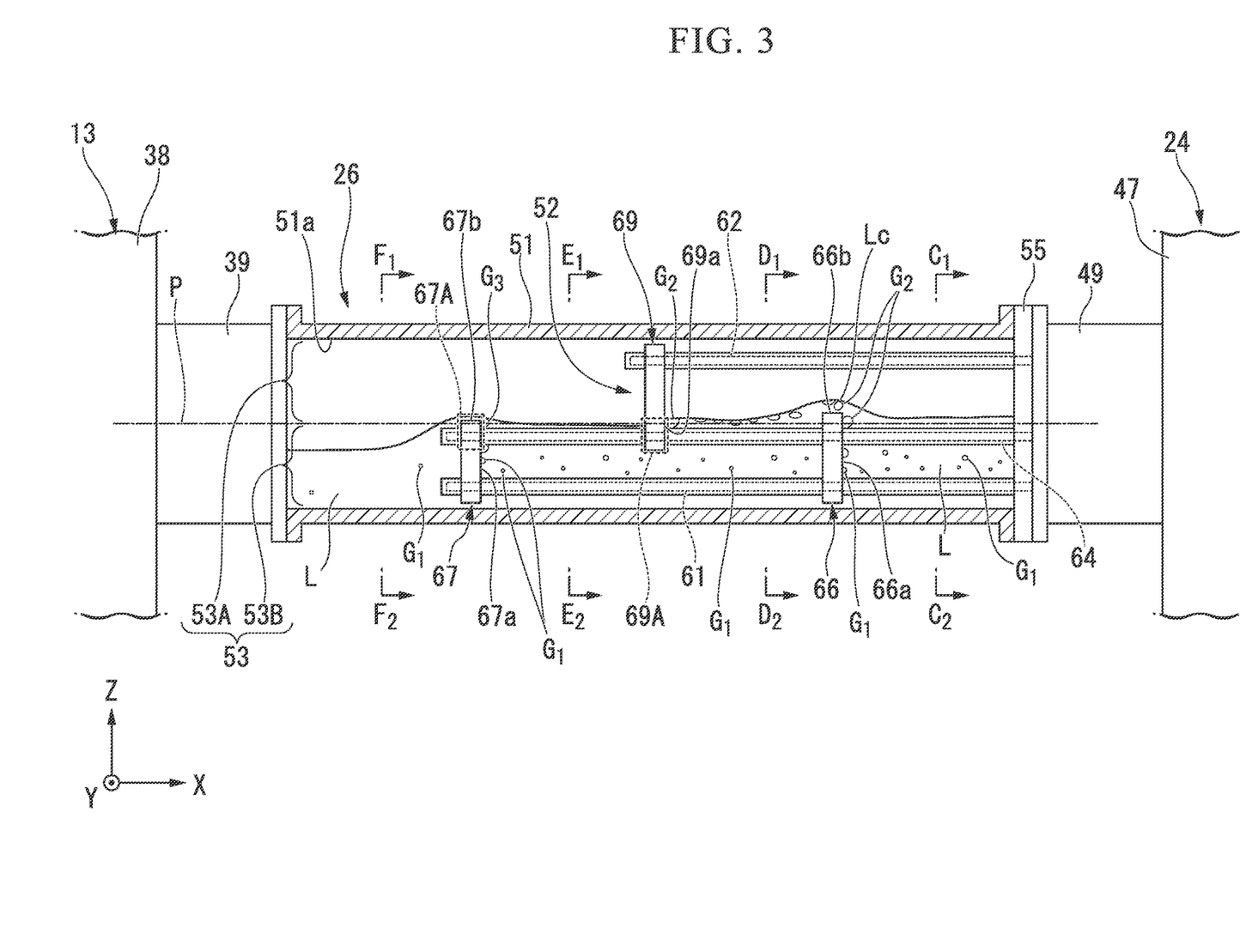
FIG. 3 is an enlarged view of a portion surrounded by a region B illustrated in FIG. 2 and a sectional view illustrating a pipe body constituting an anti-foaming pipe.

FIG. 3 is an enlarged view of a portion surrounded by a region B illustrated in FIG. 2 and a sectional view illustrating a pipe body constituting the anti-foaming pipe.

In FIG. 3, an X direction represents an extending direction of the pipe body 51, a Y direction represents a direction orthogonal to the X direction and a Z direction, the Z direction represents a vertical direction, P represents a central axis (hereinafter referred to as a "central axis P") of the pipe body 51 that constitutes the anti-foaming pipe 26, and Lc represents a liquid level (hereinafter referred to as a "liquid level Lc") of the lubricating oil L, and $G_1$ represents bubbles $G_1$ included in the lubricating oil L introduced from the delivery part 49. In FIG. 3, the same components as those of the structure illustrated in FIGS. 1 and 2 are denoted by the same reference signs.

Figure 4:
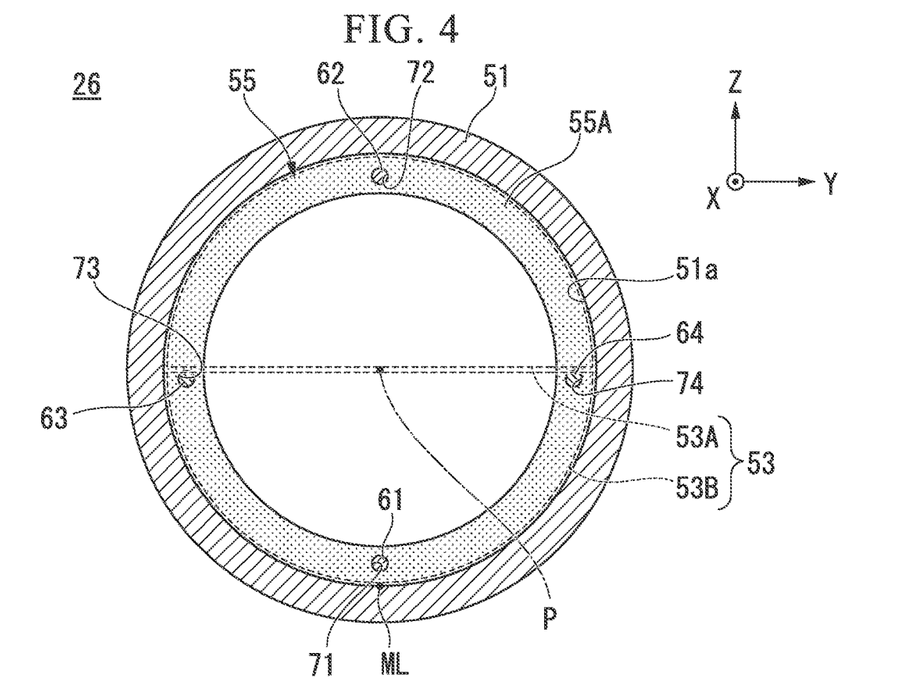
FIG. 4 is a sectional view of the anti-foaming pipe illustrated in FIG. 3 taken along line $C_1$-$C_2$.
Figure 5:
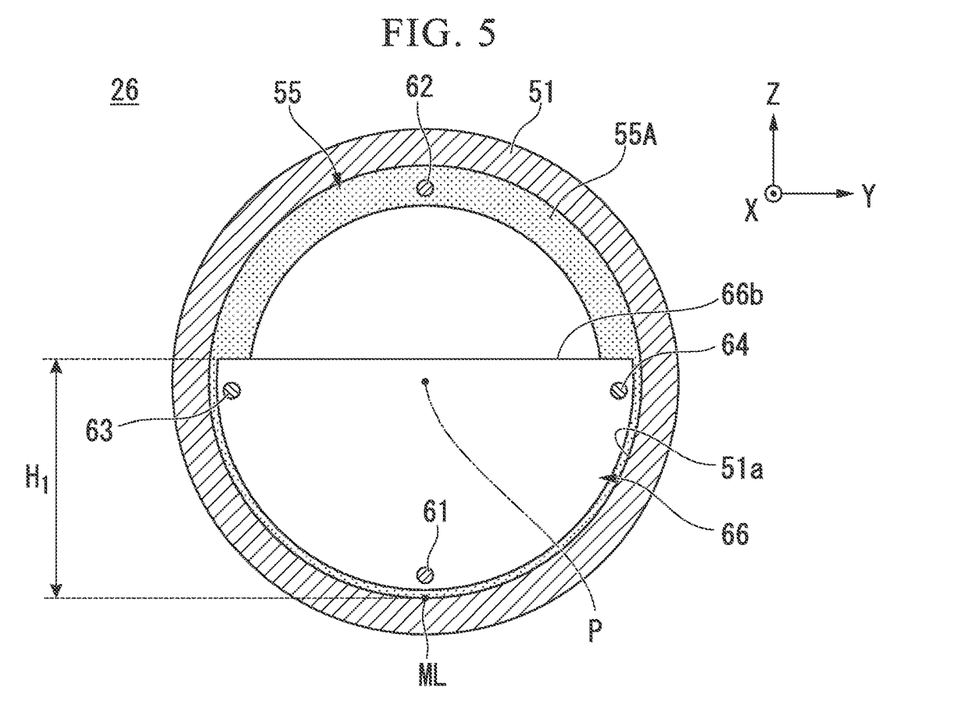
FIG. 5 is a sectional view of the anti-foaming pipe illustrated in FIG. 3 taken along line $D_1$-$D_2$.
Figure 6:
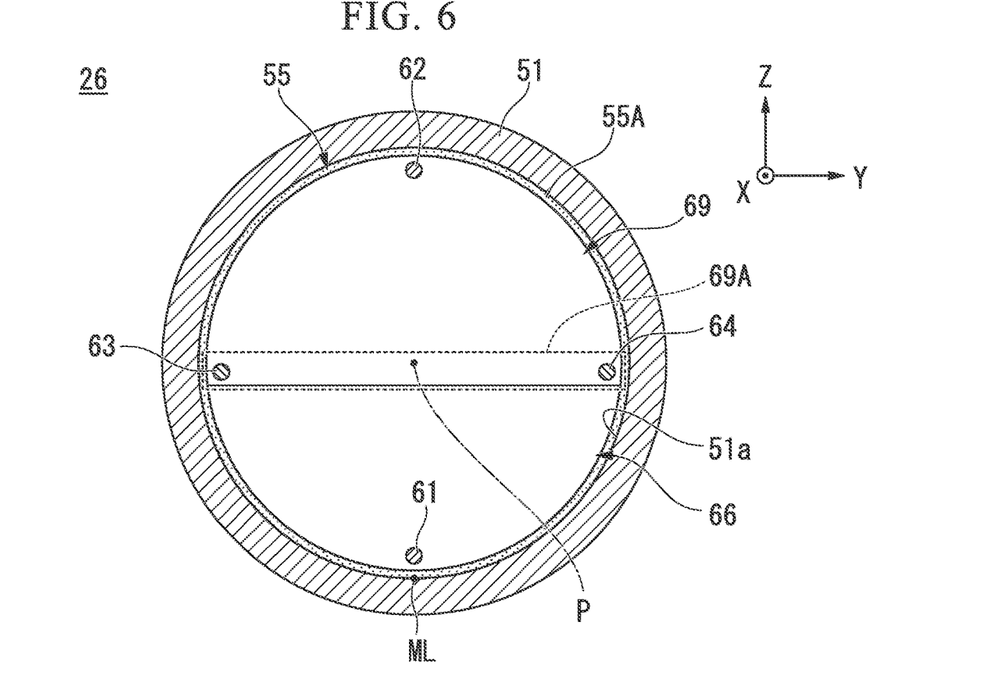
FIG. 6 is a sectional view of the anti-foaming pipe illustrated in FIG. 3 taken along line $E_1$-$E_2$.
Figure 7:
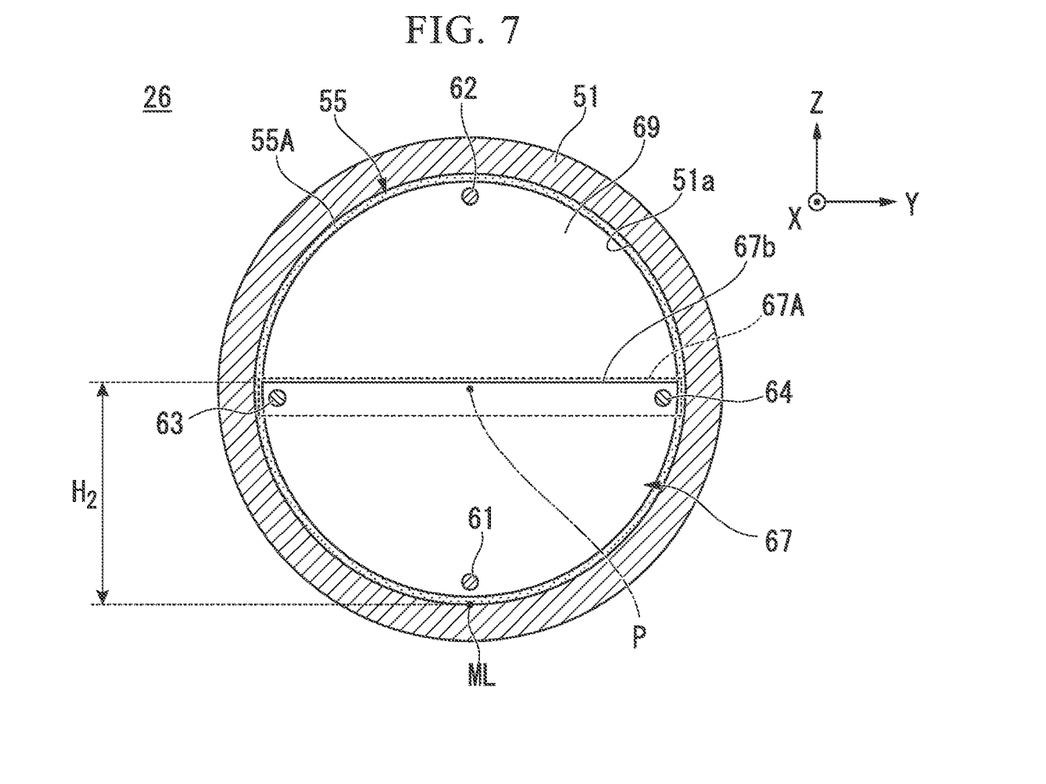
FIG. 7 is a sectional view of the anti-foaming pipe illustrated in FIG. 3 taken along line $F_1$-$F_2$.

FIG. 4 is a sectional view of the anti-foaming pipe illustrated in FIG. 3 taken along line $C_1$-$C_2$. FIG. 5 is a sectional view of the anti-foaming pipe illustrated in FIG. 3 taken along line $D_1$-$D_2$. FIG. 6 is a sectional view of the anti-foaming pipe illustrated in FIG. 3 taken along line $E_1$-$E_2$. FIG. 7 is a sectional view of the anti-foaming pipe illustrated in FIG. 3 taken along line $F_1$-$F_2$.

In FIGS. 3 to 7, a cylindrical shape is illustrated as an example of the shape of the pipe body 51.

ML illustrated in FIGS. 4 to 7 represents the lowest point (hereinafter referred to as a "lowest point ML") of a lower part 53B of a hollow part 53. In addition, the lowest point ML herein means a point where the position (height) of the hollow part 53 in the vertical direction becomes the lowest.

In FIGS. 4 to 7, the same components as those of the structure illustrated in FIGS. 2 and 3 are denoted by the same reference signs. Additionally, illustration of the lubricating oil L illustrated in FIG. 3 is omitted in FIGS. 4 to 7.

Referring to FIGS. 3 to 7, the anti-foaming pipe 26 has the pipe body 51 and an anti-foaming mechanism 52.

The pipe body 51 is formed in a cylindrical shape and extends in the X direction. The pipe body 51 has one end connected to the introducing part 39 and has the other end connected to the delivery part 49 via a ring-shaped member 55 to be described below.

The lubricating oil L used in the bearing device 33 is introduced into the pipe body 51 via the introducing part 39.

The pipe body 51 has the hollow part 53 formed in a columnar shape therein. The hollow part 53 has an upper part 53A and the lower part 53B.

The upper part 53A is disposed parallel to the X direction and the Y direction and above an imaginary plane passing through the central axis P.

The lower part 53B is disposed parallel to the X direction and the Y direction and below the imaginary plane passing through the central axis P. The upper part 53A and the lower part 53B forms an integrated single space.

The lubricating oil L introduced into the pipe body 51 flows through at least the lower part 53B. A gaseous phase (for example, air) is formed above the lubricating oil L within the pipe body 51.

The anti-foaming mechanism 52 has the ring-shaped member 55, a plurality of support rods 61 to 64, a first overflow weir 66, a second overflow weir 67, a barrier 69, and a spacer 70.

The pipe body 51 is configured such that the internal diameter thereof is smaller than the internal diameter of the ring-shaped member 55. The ring-shaped member 55 has a ring protruding part 55A that protrudes from an inner peripheral surface of the pipe body 51 toward the central axis P.

The ring-shaped protruding part 55A is disposed in a cross shape, and has mounting holes 71 to 74 on which the support rods 61 to 64 are to be mounted.

The mounting hole 71 is disposed in the vicinity of the lowest point ML of the lower part 53B. The mounting hole 72 is provided above the mounting hole 71. The mounting hole 72 is disposed so as to face the mounting hole 71 with the central axis P interposed therebetween in the Z direction.

The mounting holes 73 and 74 are disposed so as to face each other with the central axis P interposed therebetween in the Y direction.

The ring-shaped member 55 having the above configuration is disposed between the delivery part 49 and the other end of the pipe body 51.

The ring-shaped member 55 is fixed to the delivery part 49 and the pipe body 51 with bolts (not illustrated).

Since such a configuration is provided, the ring-shaped member 55 can be easily attached to and detached from the delivery part 49 and the pipe body 51, and the position of one end of each of the plurality of support rods can be restricted.

Additionally, the maintainability of the anti-foaming mechanism 52 can be improved by adopting a configuration in which the ring-shaped member 55 is attachable to and detachable from the delivery part 49 and the pipe body 51.

As a material of the ring-shaped member 55, for example, a metallic material is used. Specifically, as the material of the ring-shaped member 55, for example, it is preferable to use stainless steel having excellent corrosion resistance.

The support rod 61 has one end mounted on the mounting hole 71 and the one end supported by the ring-shaped member 55. The support rod 61 is disposed at the lower part 53B of the hollow part 53 in a state where the anti-foaming mechanism 52 is mounted on the pipe body 51. The support rod 61 extends in the X direction in a state where the support rod 61 is not in contact with an inner surface 51a of the pipe body 51.

The support rod 61 passes through the first overflow weir 66 and the second overflow weir 67 in the X direction.

The support rod 62 has one end mounted on the mounting hole 72 and has the one end supported by the ring-shaped member 55. The support rod 62 is disposed at the upper part 53A of the hollow part 53 in a state where the anti-foaming mechanism 52 is mounted on the pipe body 51. The support rod 62 extends in the X direction in a state where the support rod 62 is not in contact with the inner surface 51a of the pipe body 51.

The support rod 62 passes through the barrier 69 in the X direction. The length of the support rod 62 is shorter than the length of the support rods 61, 63, and 64.

The support rod 63 has one end mounted on the mounting hole 73 and has the one end supported by the ring-shaped member 55. The support rod 64 has one end mounted on the mounting hole 74 and has the one end supported by the ring-shaped member 55.

The support rods 63 and 64 are disposed at the hollow part 53 in a state where the anti-foaming mechanism 52 is mounted on the pipe body 51. The support rods 63 and 64 extend in the X direction in a state where the support rods 63 and 64 are not in contact with the inner surface 51a of the pipe body 51.

The support rods 63 and 64 pass through the first overflow weir 66, the second overflow weir 67, and the barrier 69 in the X direction.

The support rods 61 to 64 having the above configuration support the first overflow weir 66, the second overflow weir 67, and the barrier 69.

As a material of the support rods 61 to 64, for example, it is possible to use the same material as the ring-shaped member 55.

In addition, threaded holes are used as the above-described mounting holes 71 to 74, and a threaded part capable of being threadedly engaged with each threaded hole is provided at one end of each of the support rods 61 to 64.

Since such a configuration is provided, since it is possible to attach and detach the support rods 61 to 64 with respect to the ring-shaped member 55, maintainability can be improved.

In a state where the anti-foaming mechanism 52 is mounted on the pipe body 51, the first overflow weir 66 is positioned at the lower part 53B and a portion of the upper part 53A of the hollow part 53, which are separated from the ring-shaped member 55 and close to the lubricating oil tank 13 in the X direction, in a state where the position of the first overflow weir 66 with respect to the pipe body 51 is held.

The first overflow weir 66 has a plate-shaped member that intersects (in the case of FIG. 3, is orthogonal to) the extending direction of the pipe body 51, and has a surface 66a and an upper end surface 66b.

The surface 66a faces the ring-shaped member 55, and is a flat surface orthogonal to the X direction. The lubricating oil L introduced into the pipe body 51 via the introducing part 49 is in contact with the surface 66a. In addition, there is a case where a number of bubbles $G_1$ may be included in the lubricating oil L in this stage.

The upper end surface 66b is formed as a surface parallel to an imaginary plane passing through the X direction and the Y direction. Since such a shape is adopted, it is possible for the lubricating oil L to easily overflow the upper end surface 66b of the first overflow weir 66.

The upper end surface 66b of the first overflow weir 66 is disposed above the position of the central axis P.

Since the first overflow weir 66 having such a configuration is provided, the bubbles $G_1$ included in the lubricating oil L adhering to the surface 66a of the first overflow weir 66 are gathered and some of them are unified, then the unified and enlarged babbles $G_2$ are come rise up to the liquid level Lc of the lubricating oil L. Therefore, it is possible to escape the bubbles $G_2$ into a gaseous phase in contact with a liquid surface at the liquid level Lc of the lubricating oil.

Accordingly, since it is possible to reduce the amount of the bubbles $G_1$ and $G_2$ included in the lubricating oil L after the overflow in the first overflow weir 66, a situation in which the lubricating oil L in which a number of the bubbles $G_1$ and $G_2$ are included flows into the lubricating oil tank 13 can be suppressed.

Additionally, by using the first overflow weir 66 having the simple configuration, an increase in cost for preparation of the anti-foaming pipe 26 can be suppressed.

Moreover, since the first overflow weir 66 having the anti-foaming function is arranged within the pipe body 51, it is unnecessary to separately prepare an area for disposing the first overflow weir 66. Therefore, the first overflow weir 66 can be installed even in a case where the installation area is small.

Additionally, the first overflow weir 66 may be, for example, formed along the lower part 53B of the hollow part 53.

In this way, since the first overflow weir 66 is formed along the lower part 53B of the hollow part 53, it is possible to increase the area of the surface 66a of the first overflow weir 66. Thus, the bubbles $G_1$ included in the lubricating oil L are likely to adhere to the surface 66a of the first overflow weir 66.

Accordingly, since the plurality of bubbles $G_1$ adhering to the surface 66a of the first overflow weir 66 are likely to be gathered and unified with each other, a number of the bubbles $G_1$ included in the lubricating oil L can be caused to escape in a gaseous phase.

In a state where the anti-foaming mechanism 52 is mounted on the pipe body 51, the second overflow weir 67 is positioned at the lower part 53B and the portion of the upper part 53A of the hollow part 53, which are separated from the first overflow weir 66 and the barrier part 69 and close to the lubricating oil tank 13 in the X direction, in a state where the position of the second overflow weir 67 with respect to the pipe body 51 is held.

The second overflow weir 67 has a plate-shaped member that intersects (in the case of FIG. 3, as an example, is orthogonal to) the extending direction of the pipe body 51, and has a surface 67a and an upper end surface 67b.

The surface 67a faces the ring-shaped member 55, and is disposed to face the first overflow weir 66.

The surface 67a is a flat surface orthogonal to the X direction. The lubricating oil L, which has passed through the first overflow weir 66 and the barrier part 69, is in contact with the surface 67a.

The upper end surface 66b is formed as a surface parallel to the imaginary plane passing through the X direction and the Y direction.

The second overflow weir 67 may be, for example, formed along the lower part 53B of the hollow part 53.

In this way, since the shape of the second overflow weir 67 is formed along the inner surface 51a of the pipe body 51, the contact area between the second overflow weir 67 and the lubricating oil L increases. Therefore, the bubbles $G_1$ remaining in the lubricating oil L are likely to adhere to the surface 67a of the second overflow weir 67.

Accordingly, since the plurality of bubbles $G_1$ adhering to the surface 67a of the second overflow weir 67 are likely to be gathered and unified with each other, bubbles $G_3$, which are collectivities of the plurality of bubbles $G_1$ in the lubricating oil L, can be caused to escape in a gaseous phase in contact with the liquid level Lc.

A height $H_2$ of the second overflow weir 67 when the lowest point ML of the lower part 53B of the hollow part 53 is used as a reference may be set to be equal to or lower than a height $H_1$ of the first overflow weir 66 when the lowest point ML is used as the reference.

In this way, since the height $H_2$ of the second overflow weir 67 is equal to or lower than the height $H_1$ of the first overflow weir 66, the lubricating oil L, which has flowed over the first overflow weir 66 is likely to overflow the second overflow weir 67, thus the lubricating oil L can be easily moved toward the lubricating oil tank 13.

Additionally, since the second overflow weir 67 is provided, it is possible to set the height of the liquid level Lc of the lubricating oil L existing between the first overflow weir 66 and the second overflow weir 67 to be higher than a lower end of the barrier 69 (setting the height to a desired height). Accordingly, the lubricating oil L which has flowed over the first overflow weir 66 can be brought into contact with a lower end part 69A of the barrier 69.

Since the second overflow weir 67 having the above-described configuration is provided, the same effects as those of the first overflow weir 66 can be obtained. Therefore, the amount of the bubbles $G_1$ included in the lubricating oil L which has flowed over the second overflow weir 67 can be further reduced.

In a state where the anti-foaming mechanism 52 is mounted on the pipe body 51, the barrier 69 is separated from the first overflow weir 66 and the second overflow weir 67, and is positioned at the upper part 53A and a portion of the lower part 53B of the hollow part 53, which are located between the first overflow weir 66 and the second overflow weir 67, in a state where the position of the barrier with respect to the pipe body 51 is held.

The barrier 69 has a plate-shaped member that intersects (in the case of FIG. 3, is orthogonal to) the extending direction of the pipe body 51, and has a surface 69a and a lower end part 69A.

The surface 69a faces the first overflow weir 66, and is a flat surface orthogonal to the X direction. An upper stream of the lubricating oil L, which has flowed over the first overflow weir 66, is in contact with the surface 69a. The bubbles $G_2$ that have escaped neither as the bubbles $G_1$ nor in the gaseous phase are included in the upper stream of the lubricating oil L.

The lower end part 69A of the barrier 69 is disposed so as to face an upper end part 67A of the second overflow weir 67 in the X direction. The lubricating oil L, which has flowed over the first overflow weir 66, passes through between the lower end part 69A of the barrier 69 and an inner surface 51a of the pipe body 51, and flows toward the second overflow weir 67.

In this way, since the lower end part 69A of the barrier 69 faces the upper end part 67A of the second overflow weir 67 in the X direction, it is possible to reliably bring the upper stream of the lubricating oil L, which has flowed over the first overflow weir 66 and includes a number of the bubbles $G_1$ and $G_2$, into contact with the surface 69a located at the lower end part 69A of the barrier 69.

Accordingly, since it is possible to hold the bubbles $G_1$ and $G_2$ included in the upper stream of the lubricating oil L by the lower end part 69A of the barrier 69, the amount of the bubbles $G_1$ and $G_2$ included in the lubricating oil L that flows toward the second overflow weir 67 can be further reduced.

Additionally, the barrier 69 may be, for example, formed along the upper part 53A of the hollow part 53.

In this way, since the shape of the barrier 69 is formed along the upper part 53A of the hollow part 53, the contact area between the lower end part 69A of the barrier 69 and the upper stream of the lubricating oil L is increased. Therefore, it is possible to further suppress a situation where the bubbles $G_1$ and $G_2$ included in the upper stream of the lubricating oil L move toward the second overflow weir 67.

In a state where the anti-foaming mechanism 52 is mounted on the pipe body 51, for example, a gap may be provided between the inner surface 51a of the pipe body 51, the first overflow weir 66, the second overflow weir 67, and the barrier 69.

In this way, since the gap between the inner surface 51a of the pipe body 51 is provided, and the first overflow weir 66, the second overflow weir 67, and the barrier 69, the inner surface 51a of the pipe body 51, and the first overflow weir 66, the second overflow weir 67, and the barrier 69 are less likely to come into contact with each other when the anti-foaming mechanism 52 is attached to and detached from the pipe body 51.

For this reason, the attachment and detachment of the anti-foaming mechanism 52 with respect to the pipe body 51 can be easily performed, and damage to the first overflow weir 66, the second overflow weir 67, and the barrier 69 at the time of the attachment and detachment of the anti-foaming mechanism 52 can be suppressed.

Additionally, in the X direction, the spacing between the ring-shaped member 55 and the first overflow weir 66, the spacing between the first overflow weir 66 and the barrier 69, and the spacing between the barrier 69 and the second overflow weir 67, can be appropriately set in accordance with the type, the flow rate, or the like of a liquid (the lubricating oil L in the case of a first embodiment) to be used.

The spacer 70 is disposed so as to cover portions of outer peripheral surfaces of the support rods 61 to 64 where the first overflow weir 66, the second overflow weir 67, and a barrier 69 are not disposed.

The spacer 70 is a member for restricting the positions of the first overflow weir 66, the second overflow weir 67, and the barrier 69 in the X direction within the pipe body 51.

It is preferable to use, for example, stainless steel having excellent corrosion resistance as the spacer 70.

In addition, the positions of the first overflow weir 66, the second overflow weir 67, and the barrier 69 in the X direction within the pipe body 51 may be restricted using separate members (for example, bolts or the like) without using the spacer 70.

According to the anti-foaming pipe 26 of the first embodiment, since the simple configuration that does not require a pressure-reducing valve as described above is provided, an increase in cost for preparation of the anti-foaming pipe 26 can be suppressed, and the anti-foaming pipe 26 that removes the bubbles $G_1$ included in the lubricating oil L can be installed even in a case where the installation area is small.

Additionally, according to the compressor system 10 of the first embodiment having the above-described anti-foaming pipe 26, as the lubricating oil L passes through the inside of the anti-foaming pipe 26, it is possible to reduce the amount of the bubbles $G_1$ to $G_3$ included in the lubricating oil L that is returned from the auxiliary tank 24 to the lubricating oil tank 13.

Accordingly, since it is possible to sufficiently perform the anti-foaming of the lubricating oil L returned to the lubricating oil tank 13, damage to the feed pump 16 resulting from the bubbles $G_1$ to $G_3$ included in the lubricating oil L can be suppressed.

Additionally, in the first embodiment, a case where the anti-foaming mechanism 52 includes the first overflow weir 66, the second overflow weir 67, the barrier 69, the support rods 61 to 64, and the ring-shaped member 55 has been described as an example. However, in a case where the anti-foaming mechanism 52 is sufficiently heavy in weight of the first overflow weir 66, the second overflow weir 67, the barrier 69, and the support rods 61 to 64 (specifically, in a case where the weight is such that the anti-foaming mechanism does not move due to the lubricating oil L), the anti-foaming mechanism may be constituted of only the first overflow weir 66, the second overflow weir 67, the barrier 69, and the support rods 61 to 64.

In this case, the number of components of the anti-foaming mechanism can be reduced. Additionally, since the anti-foaming mechanism can be installed inside the pipe body 51 by being placed into the pipe body 51, installation and recovery of the anti-foaming mechanism into the pipe body 51 can be easily performed.

Additionally, in the first embodiment, a case where the first overflow weir 66, the second overflow weir 67, and the barrier 69 are supported using the four support rods 61 to 64 has been described as an example. However, the number of support rods that support the first overflow weir 66, the second overflow weir 67, and a barrier 69 can be appropriately set and is not limited to four.

Second Embodiment

Figure 8:
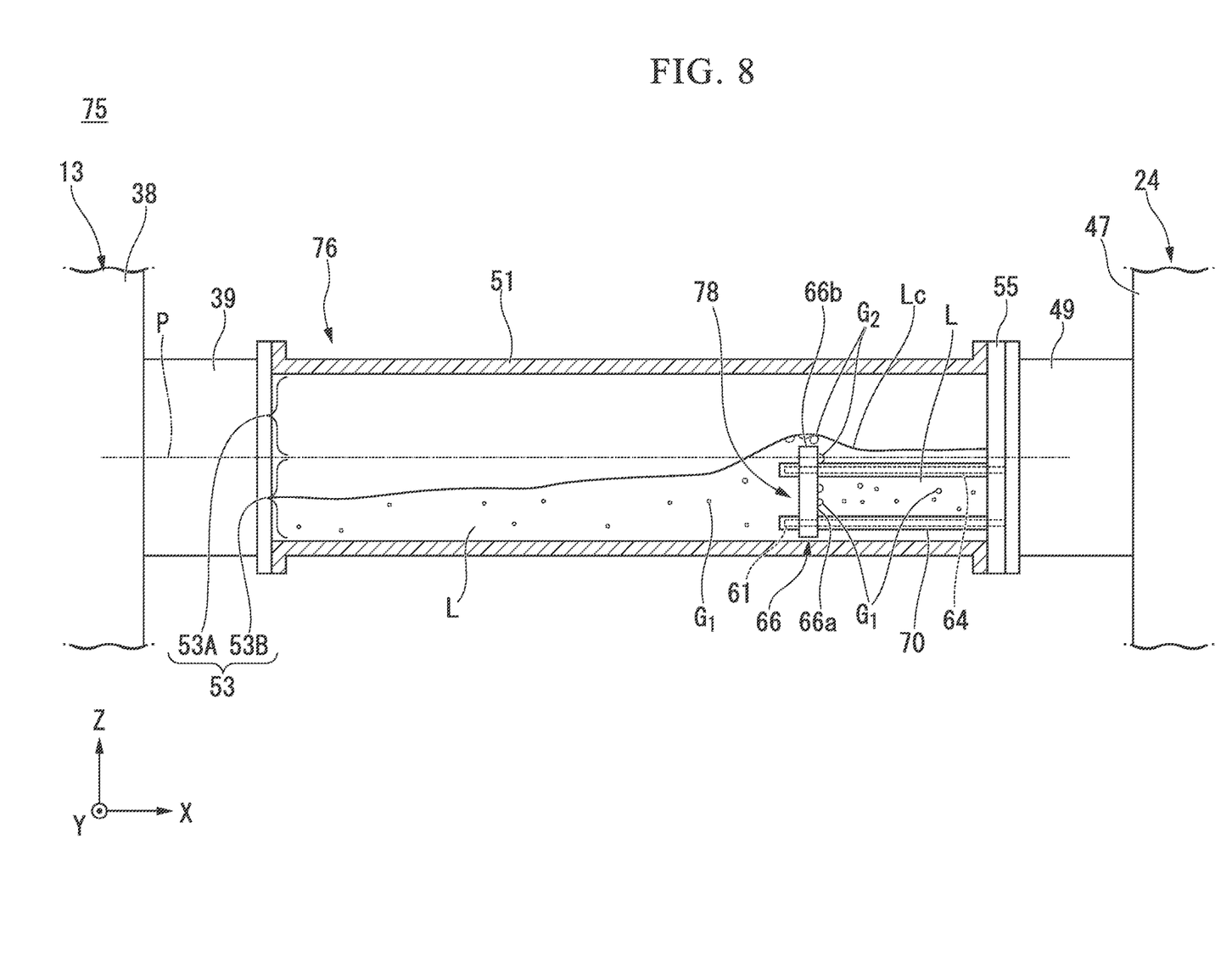
FIG. 8 is an enlarged view of principal parts of a compressor system of a second embodiment of the invention.

FIG. 8 is an enlarged view of principal parts of a compressor system of a second embodiment of the invention. In FIG. 8, only the pipe body 51 among the principal parts of a compressor system 75 is illustrated in a section. In FIG. 8, the same components as those of the compressor system 10 of the first embodiment are denoted by the same reference signs.

In addition, in FIG. 8, since it is difficult to illustrate the support rod 63 (a support rod having a length shorter than the support rod 63 illustrated in FIG. 4) that constitutes an anti-foaming pipe 76, illustration of the support rod 63 is omitted.

Referring to FIG. 8, the compressor system 75 of the second embodiment is configured similarly to the compressor system 10 except for having an anti-foaming pipe 76 including the pipe body 51 and an anti-foaming mechanism 78 instead of the anti-foaming pipe 26 that constitutes the compressor system 10 of the first embodiment.

The anti-foaming mechanism 78 is configured similarly to the anti-foaming mechanism 52 described earlier except for removing the second overflow weir 67, the barrier 69, and the support rod 62 that constitute the anti-foaming mechanism 52 from the constituent elements and shortening the length of the support rods 61, 63, and 64.

Since the anti-foaming pipe 76 of the second embodiment having such a configuration has the first overflow weir 66, the bubbles $G_1$ included in the lubricating oil L adhering to the surface 66a of the first overflow weir 66 are gathered and unified with each other. The unified and enlarged babbles are come rise up to the liquid level Lc of the lubricating oil L, thus the bubbles $G_2$ can be escaped into into a gaseous phase in contact with a liquid surface at the liquid level Lc of the lubricating oil. Therefore, it is possible to suppress a situation where the lubricating oil L including a number of the bubbles $G_1$ and $G_2$ flows into the lubricating oil tank 13.

Additionally, since the configuration of the anti-foaming mechanism 78 is very simplified, an increase in cost for preparation of the anti-foaming pipe 76 can be further suppressed.

Additionally, since the anti-foaming mechanism 78 is installed inside the pipe body 51, it becomes unnecessary to separately prepare the installation area for disposing the anti-foaming mechanism 78. Therefore, the anti-foaming mechanism 78 can be installed even in a case where the installation area is small.

Third Embodiment

Figure 9:
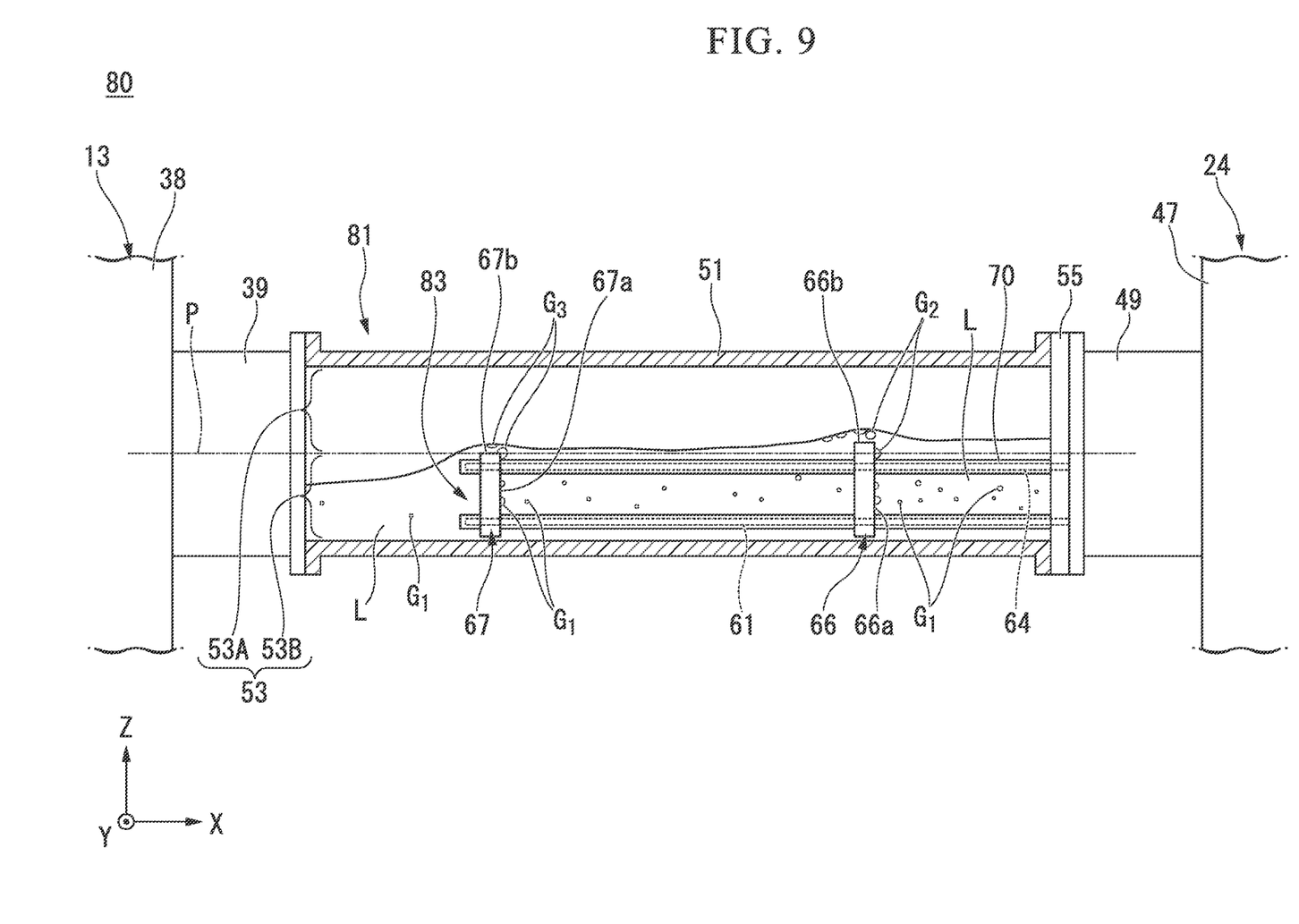
FIG. 9 is an enlarged view of principal parts of a compressor system of a third embodiment of the invention.

FIG. 9 is an enlarged view of principal parts of a compressor system of a third embodiment of the invention. In FIG. 9, only the pipe body 51 among the principal parts of a compressor system 80 is illustrated in a section. In FIG. 9, the same components as those of the compressor system 10 of the first embodiment are denoted by the same reference signs.

Referring to FIG. 9, the compressor system 80 of the third embodiment is configured similarly to the compressor system 10 except for having an anti-foaming pipe 81 including the pipe body 51 and an anti-foaming mechanism 83 instead of the anti-foaming pipe 26 that constitutes the compressor system 10 of the first embodiment.

The anti-foaming mechanism 81 is configured similarly to the anti-foaming mechanism 52 described earlier except for removing the barrier 69 and the support rod 61 that constitute the anti-foaming mechanism 52 from the constituent elements.

Since the anti-foaming pipe 83 of the third embodiment having such a configuration has the first overflow weir 66 and the second overflow weir 67, it is possible to cause a plurality of the bubbles $G_1$ included in the lubricating oil L which has passed over the first overflow weir 66 to adhere to the surface 67a of the second overflow weir 67, and cause the gathered and unified bubbles $G_3$ to escape into a gaseous phase in contact with a liquid surface at the liquid level Lc of the lubricating oil. Thus, it is possible to suppress a situation where the lubricating oil L in which a number of the bubbles $G_1$ and $G_3$ are included flows into the lubricating oil tank 13.

Additionally, since the configuration of the anti-foaming mechanism 83 is made simpler than the anti-foaming mechanism 52 described in the first embodiment, an increase in cost for preparation of the anti-foaming pipe 81 can be suppressed.

Additionally, the anti-foaming mechanism 83 is installed inside the pipe body 51, it becomes unnecessary to separately prepare the area for disposing the anti-foaming mechanism 83. Therefore, the anti-foaming mechanism 83 can be installed even in a case where the installation area is small.

Although the embodiments have been described above in detail, the invention is not limited to the specific embodiments, and various alterations and changes can be made within the scope described in the claims.

In addition, although the pipe body 51 formed in a cylindrical shape has been described as an example in the first to third embodiments, the shape of the pipe body 51 is not limited to the cylindrical shape. In the invention, for example, a tubular pipe in which an outer shape is a quadrangular shape may be used as the pipe body 51. Even in this case, the same effects as those of the first to third embodiments can be obtained.

Additionally, in the first to third embodiments, cases where the anti-foaming pipes 26, 76, and 81 are used for the compressor systems 10, 75, and 80 that use the lubricating oil L as the liquid have been described as examples. However, the anti-foaming pipes 26, 76, and 81 can also be applied to, for example, a cooling water supply system that uses water as the liquid.

INDUSTRIAL APPLICABILITY

The invention can be applied to an anti-foaming pipe that removes bubbles included in a liquid, and a compressor system including the anti-foaming pipe.

REFERENCE SIGNS LIST 10, 75, 80: COMPRESSOR SYSTEM
11: COMPRESSOR
13: LUBRICATING OIL TANK
14, 22: LUBRICATING OIL SUPPLY LINE
14A, 22A: LINE
14B, 22B: FIRST BRANCH LINE
14C, 22C: SECOND BRANCH LINE
16: FEED PUMP
17: OIL COOLER
19: OIL FILTER
22: LUBRICATING OIL RETURN LINE
24: AUXILIARY TANK
26, 76, 81: ANTI-FOAMING PIPE
31: CASING
31A: THRUST COLLAR
32: ROTOR
33: BEARING DEVICE
33A, 33B: RADIAL BEARING PART
33C, 33D: THRUST BEARING PART
35: DRY GAS SEALING PART
38, 47: TANK BODY
39, 48: INTRODUCING PART
41, 49: DELIVERY PART
43: DRAIN NOZZLE
43A: DISCHARGE PORT
44: DEGASSING TRAY
44A: FIRST PORTION
44B: SECOND PORTION
51: PIPE BODY
51a: INNER SURFACE
52, 78, 83: ANTI-FOAMING MECHANISM
53: HOLLOW PART
53A: UPPER PART
53B: LOWER PART
55: RING-SHAPED MEMBER
55A: RING-SHAPED PROTRUDING PART
61, 64: SUPPORT ROD
66: FIRST OVERFLOW WEIR
66a, 67a, 69a: SURFACE
66b, 67b: UPPER END SURFACE
67: SECOND OVERFLOW WEIR
67A: UPPER END PART
69: BARRIER
69A: LOWER END PART
70: SPACER
71 TO 74: MOUNTING HOLE $H_1, H_2$: HEIGHT
$G_1, G_2, G_3$: BUBBLE
L: LUBRICATING OIL
La, Lb, Lc: LIQUID LEVEL
ML: LOWEST POINT
O: AXIS
P: CENTRAL AXIS

The invention claimed is:

1. An anti-foaming pipe, comprising:
a pipe body having a hollow part, a liquid flows through at least a lower part of the hollow part, and of which one end is connected to a tank, wherein the liquid is introduced to the tank through the pipe body; and
an anti-foaming mechanism configured to be removably attached to the pipe body, wherein the anti-foaming mechanism includes
a first overflow weir positioned at least a lower part of the hollow part in a state where a position of the first overflow weir with respect to the pipe body is held, wherein the liquid is allowed to flow over the first overflow weir toward the tank,
a plurality of support rods extending in the extending direction of the pipe body and which support the first overflow weir, and
a ring-shaped member positioned at the other end of the pipe body to secure one end of each of the plurality of support rods.

2. The anti-foaming pipe according to claim 1, wherein the first overflow weir is a plate-shaped member across an extending direction of the pipe body, and
the first overflow weir is formed along the lower part of the hollow part.

3. The anti-foaming pipe according to claim 1, wherein the anti-foaming mechanism further includes a second overflow weir positioned at least the lower part of the hollow part so as to be close to the tank with respect to the first overflow weir in a state where a position of the second overflow weir with respect to the pipe body is held, wherein the liquid, which has flowed over the first overflow weir, is allowed to flow over the second overflow weir toward the tank, and wherein
the second overflow weir is supported by the plurality of support rods.

4. The anti-foaming pipe according to claim 3, wherein a height of the second overflow weir from the lowest point of the lower part of the hollow part is equal to or lower than that of the first overflow weir from the lowest point of the lower part of the hollow part.

5. The anti-foaming pipe according to claim 3, wherein the second overflow weir is a plate-shaped member across the extending direction of the pipe body, and
the second overflow weir is formed along the lower part of the hollow part.

6. The anti-foaming pipe according to claim 3, wherein the anti-foaming mechanism further includes a barrier positioned at least an upper part of the hollow part so as to be close to the tank with respect to of the first overflow weir in a state where a position of the barrier with respect to the pipe body is held, wherein an upper stream of the liquid, which has overflowed the first overflow weir, is capable of contacting with the barrier, and the liquid is allowed to pass through the barrier toward the second overflow weir, and wherein
the barrier is supported by the plurality of support rods.

7. The anti-foaming pipe according to claim 6, wherein the barrier is a plate-shaped member across the extending direction of the pipe body, and
the barrier is formed along the upper part of the hollow part.

8. The anti-foaming pipe according to claim 6, wherein a lower end part of the barrier faces an upper end part of the second overflow weir in the extending direction of the pipe body.

9. The anti-foaming pipe according to claim 6, wherein, in a state where the anti-foaming mechanism is mounted on the pipe body, a gap is provided between an inner surface of the pipe body and each of the first overflow weir, the second overflow weir and the barrier.

10. A compressor system, comprising:
the anti-foaming pipe according to claim 1;
a compressor including a rotor which is rotatable around an axis, and a bearing device supporting the rotor in a rotatable state;
a lubricating oil tank which is connected to one end of the anti-foaming pipe and in which lubricating oil is stored;
a lubricating oil supply line which is connected to the lubricating oil tank and the bearing device;
a pump which is installed on the lubricating oil supply line and configured to supply the lubricating oil stored in the lubricating oil tank to the bearing device;
an auxiliary tank which is connected to the other end of the anti-foaming pipe; and
a lubricating oil return line of which one end is connected to the bearing device and the other end is connected to the auxiliary tank, wherein the lubricating oil, which has recovered from the bearing device, returned to the auxiliary tank.

* * * * *